July 19, 1955

W. D. HILL 2,713,303

HAY BALER

Filed July 8, 1953

Wade D. Hill
INVENTOR,

BY Bernard P. Miller

ATTORNEY

July 19, 1955

W. D. HILL 2,713,303

HAY BALER

Filed July 8, 1953

Wade D. Hill
INVENTOR,

BY Bernard P. Miller
ATTORNEY

Wade D. Hill
INVENTOR,

BY Bernard P. Miller
ATTORNEY

July 19, 1955  W. D. HILL  2,713,303
HAY BALER
Filed July 8, 1953  4 Sheets-Sheet 4
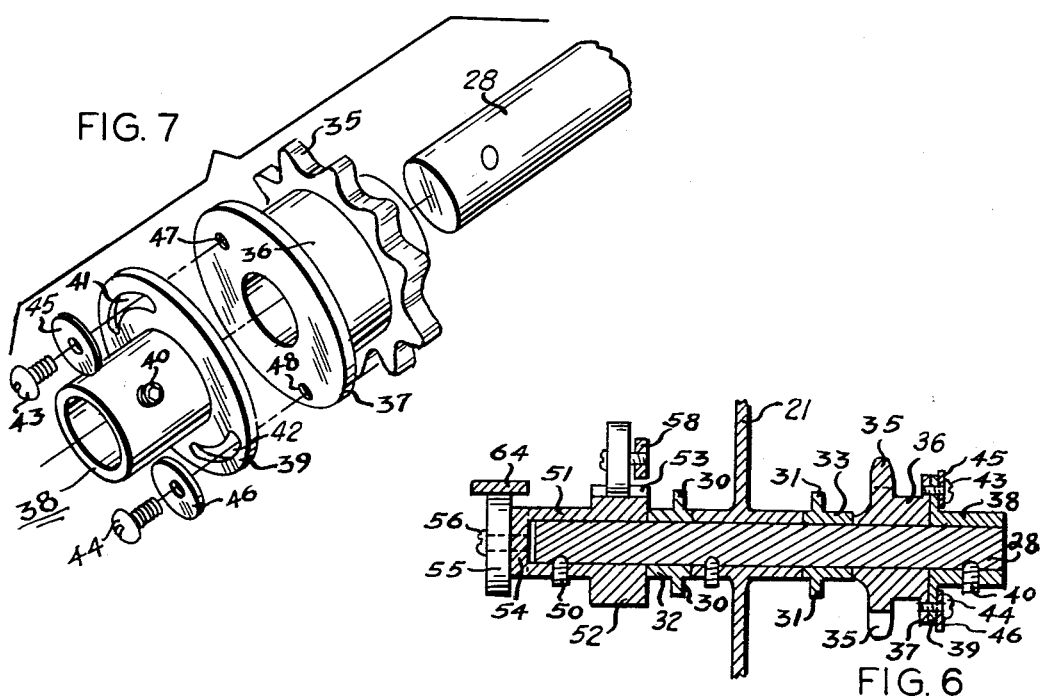
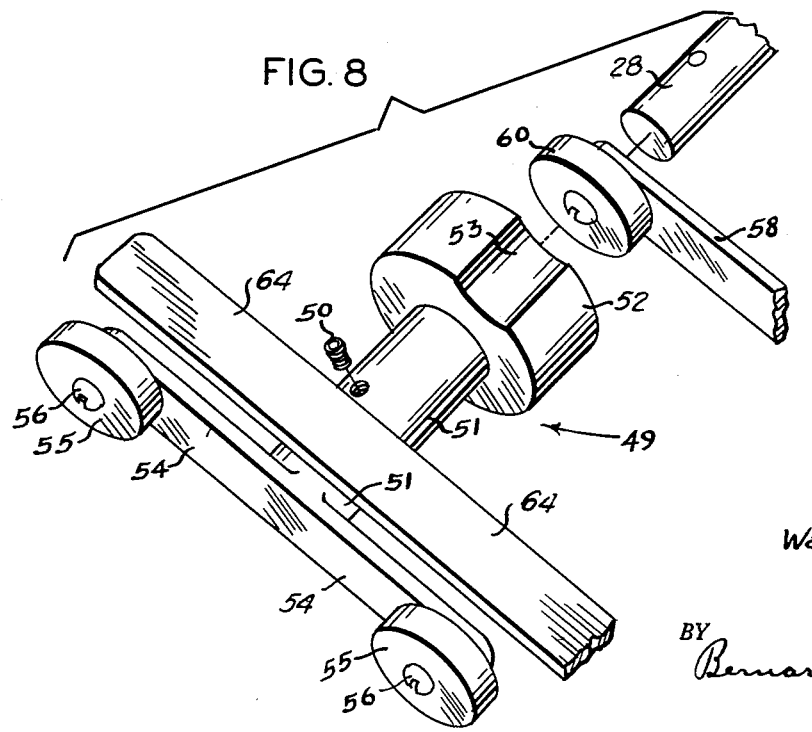
Wade D. Hill
INVENTOR,
BY Bernard P. Miller
ATTORNEY United States Patent Office 2,713,303
Patented July 19, 1955

2,713,303

HAY BALER

Wade D. Hill, Yale, Okla.

Application July 8, 1953, Serial No. 366,724

2 Claims. (Cl. 100—4)

The present invention relates to hay baling apparatus, and more particularly to mechanism for automatically controlling the length of the bales produced by such apparatus.

The mechanism of the present invention is designed to operate in conjunction with the bale case of substantially any conventional hay baling apparatus, which is currently on the market in this country.

Insofar as I have known, or have been able to ascertain, most conventional hay baling apparatuses utilize a "star wheel," which is driven by its contact with hay in the bale case, for tripping the bale tying mechanism. The arrangement is such, that should a considerable "slug" of hay enter the bale case just prior to the actuation of the tying mechanism, the bale then to be tied will be longer than standard. This, in itself, would not be of too serious consequence, if it were not for the fact that every time a "long" bale is tied, the next ensuing bale is shortened an equal amount.

While the device of the present invention does not prevent the formation of a "long" bale, it is so designed that the next ensuing bale will not be affected by the length of the preceding "long" bale.

It is therefore the prime object of the present invention to provide an attachment for conventional hay balers, which will permit each bale to be sized individually without in any way being affected by the length of any other bale.

An additional object is to provide a bale controlling mechanism which is operated by the operative elements of a conventional hay baler.

A further object is to provide an apparatus of this class which is positive in action.

With reference to the drawings:

Figure 6 is a similar view taken substantially along the line 6—6 of Fig. 3;

Figure 7 is an exploded perspective view detailing a portion of the device; and, Figure 8 is an exploded perspective view detailing another portion of the device.

Like characters of reference designate like parts in those figures of the drawings in which they occur.

In the drawings:

Figure 5:
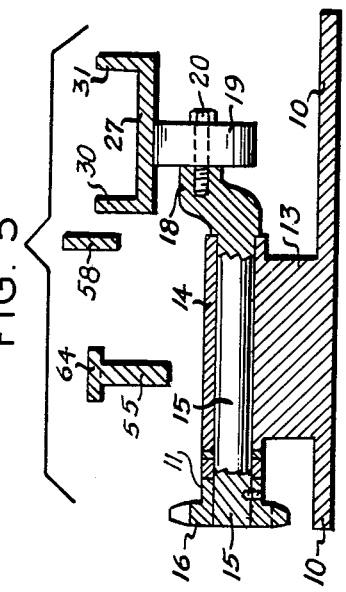
Figure 5 is a vertical sectional view taken substantially along the line 5—5 of Fig. 3.

The reference numeral 1 indicates, as a whole, a conventional hay baler having a horizontal hollow bale case or box 2 into which hay is mechanically conveyed, and within which the hay is mechanically compressed. The baler further includes a rotatable horizontal shaft 3, which when rotated, acts to actuate a bale tying mechanism, not completely shown, but which acts to tie wires longitudinally around hay in the bale case to form a bale. The shaft 3 of the baler is conventionally rotated by a toothed bale measuring wheel which, in turn, is rotated by hay being compressed within the bale case 2.

While applicant includes a bale measuring wheel in his mechanism, it is not mounted in a conventional manner. The conventional bale measuring or gauging wheel is in constant contact with the hay which is moved longitudinally within the bale case 2, and the wheel is therefore continuously rotated, so long as hay is being fed into the bale case. The gauge wheel is so arranged with the shaft 3, that a bale is tied upon each complete revolution of the wheel. Consequently, if one bale is erroneously made too long, the next bale will be the same amount too short, because the two bales will have been tied during two complete revolutions of the gauge wheel. As stated hereinabove, a long bale is caused by a large tuft or "slug" of hay entering the bale case, just at the time the tying apparatus is about to be actuated.

The device of the present invention is designed to move the bale gauging wheel out of engagement with the hay in the bale box, each time the bale tying mechanism is actuated, and is also designed to set the wheel in a given radial position, while it is out of engagement with the hay. The gauge wheel therefore starts at a zero point in gauging the next following bale, so that the length of the preceding bale has no effect upon the length of the bale currently being formed. With the above described operational purpose in mind, the apparatus of the present invention will next be described hereinbelow.

It is first pointed out, however, that the conventional hay baler includes a horizontal shaft 4 which is adapted to be rotated through one complete revolution each time the bale tying mechanism goes through one bale tying cycle, and that in order to operate the mechanism of the present invention, the shaft 4 is equipped with a sprocket 5, which is not found on the conventional hay baler.

Figure 1:
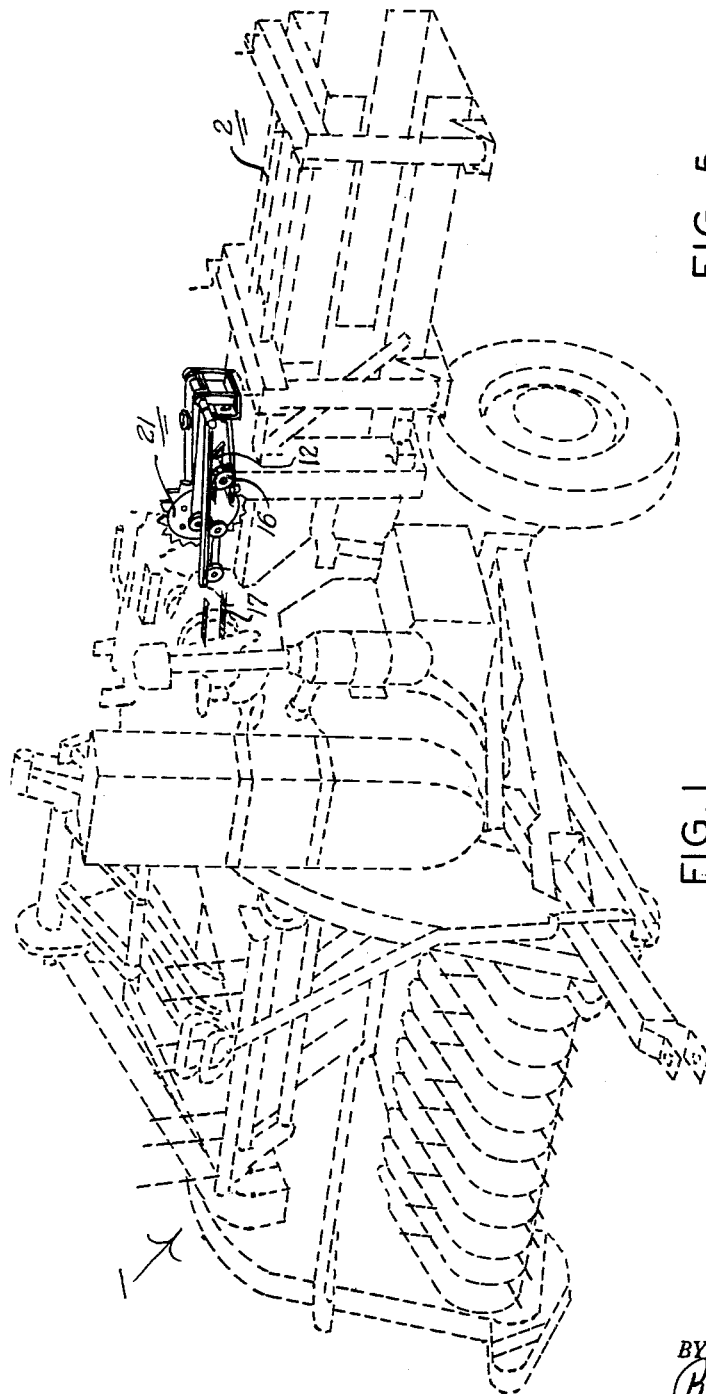
Figure 1 is a dotted line perspective view of a conventional hay baler, the device of the present invention being shown in solid lines, operatively installed thereon.
Figure 2:
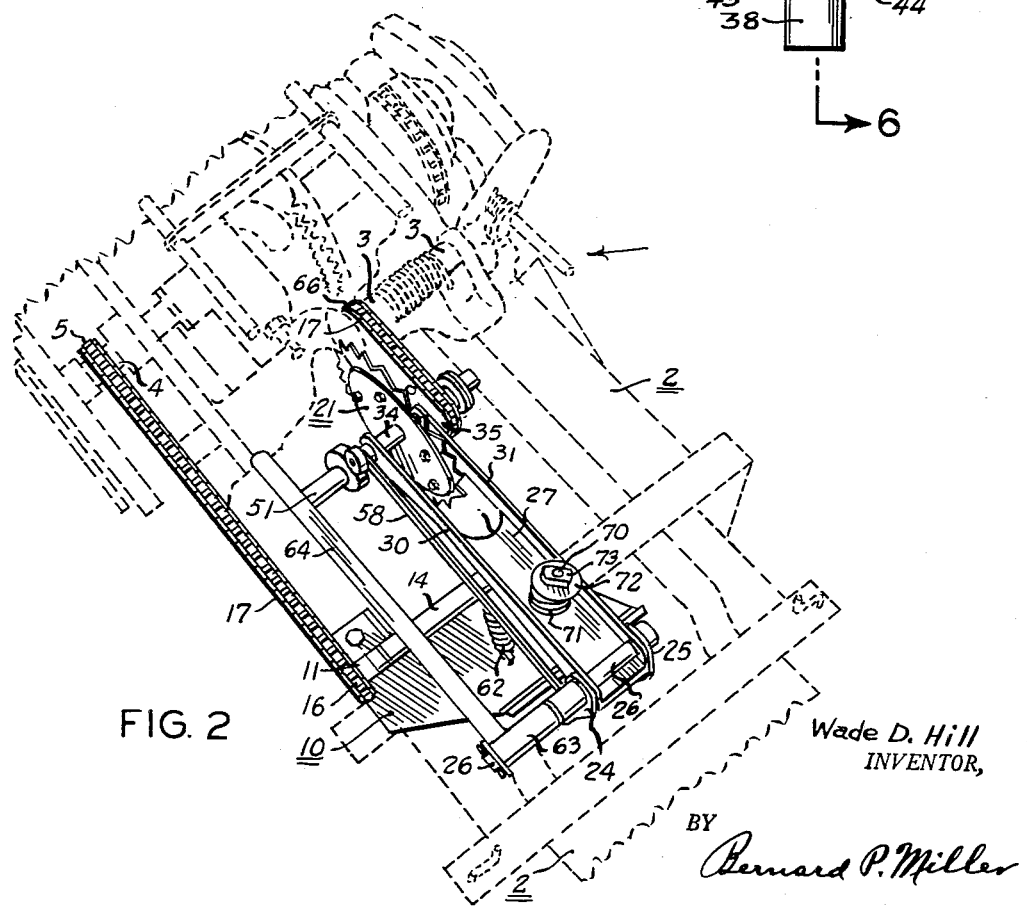
Figure 2 is a fragmentary perspective view of the same, looking downward thereon.

The apparatus of the present invention, per se, includes a flat-bottomed base member 10 of metal which is bolted or otherwise rigidly mounted upon the upper surface of the bale box 2 adjacent its inner or left hand end, as viewed in Figs. 1 and 2. The upper surface of the base member or plate 10 is provided with a rigid transverse upstanding web 13 which is integral with and supports a bearing 14 for journalling a horizontal shaft 15 (Fig. 5). A brace web 12 is rigidly connected to the web 13 and the plate 10. The shaft 15 projects forwardly of the baler beyond the front end of the bearing 14, and the front end of the shaft is equipped with a sprocket 16 having a flange 11 by which it is rigidly anchored to the shaft 15. An endless drive chain envelops the sprocket 16 and the above described extra sprocket 5 on the baler shaft 4, so that the shaft 15 is driven by the shaft 4. The other, or rear end of the shaft 15 projects beyond the rear end of the bearing 14, and this projecting end is off-set from the axis of the shaft to provide a crank-arm 18. The extreme rear portion of the crank-arm 18 is reduced in diameter and rotatably supports a cam-roller 19. The roller is held on the crank-arm by a suitable stud 20.

Figure 4:
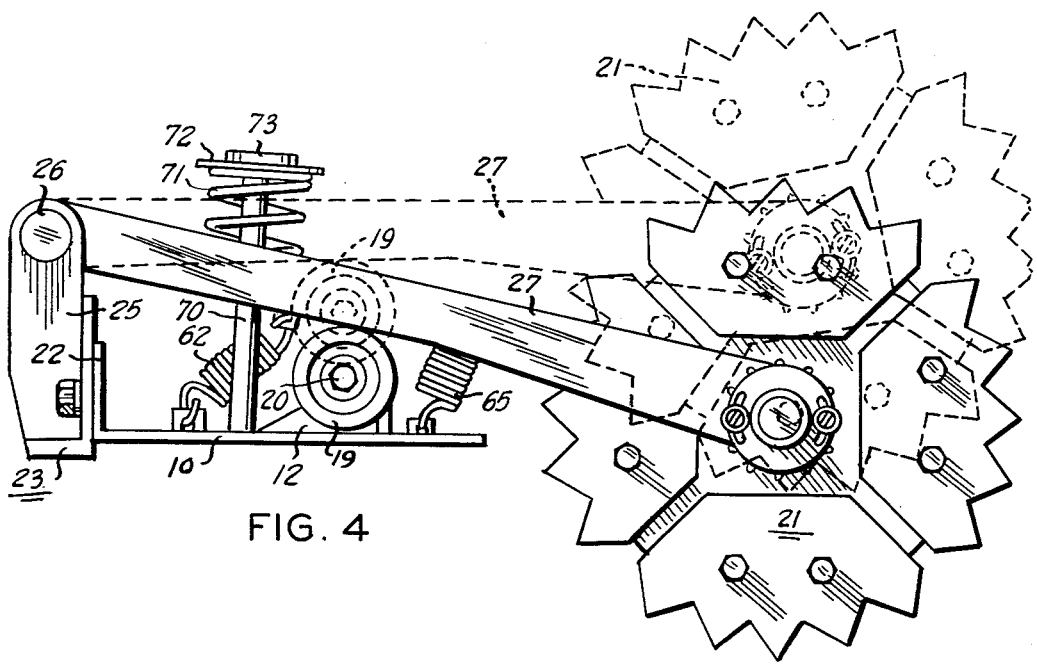
Figure 4 is a side elevational view of the device.

It is obvious that when the shaft 15 is rotated through one complete revolution by the rotation of the baler shaft 4, the cam-roller 19 will pass through an operational cycle wherein it is raised from a position adjacent the plate 10, and is thereafter returned to its lowermost or normal position. The operational cycle is illustrated in Fig. 4 wherein the solid lines represent the roller's normal lowered position, and the dotted lines show the roller in its raised position. It has been stated hereinabove that the baler shaft 4 is a conventional part of the bale tying mechanism, and that the shaft rotates only once during the bale tying operation. It therefore follows that the cam-carrying shaft 15 will likewise be rotated only once during each bale tying operation.

It has further been stated hereinabove that the present device is designed to move the bale gauging wheel out of contact with hay in the bale case, each time a bale is tied. The vertical movement of the cam-roller 19 is utilized to accomplish the raising and then lowering of the bale gauging wheel in the following described manner. The reference numeral 21 indicates a conventional bale gauging wheel, but in the present case, the wheel 21 is not mounted on the bale case in a conventional manner.

Figure 9:
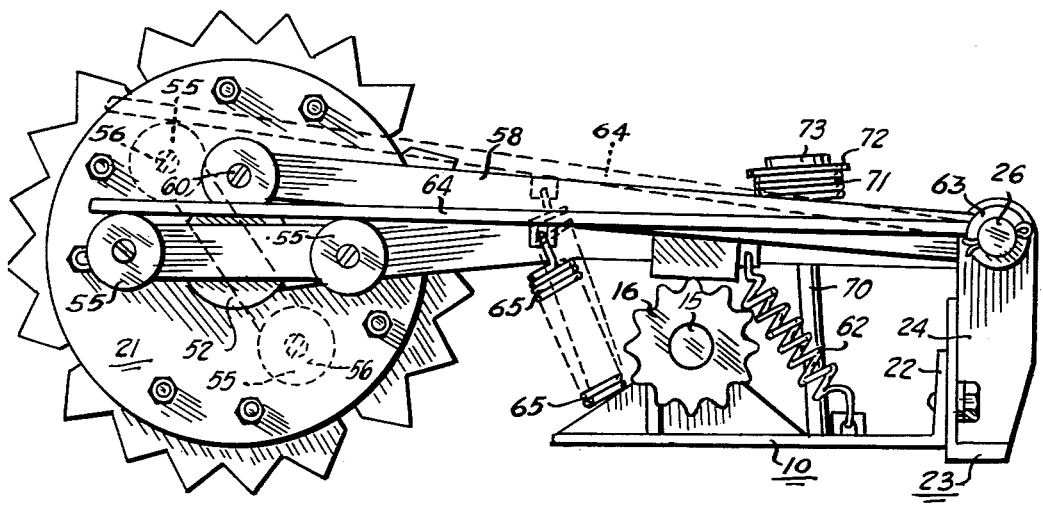

As a means for operatively mounting the wheel 21, the right hand end of the plate 10, as the device is viewed in Figs. 1, 2 and 9, is provided with an integral upstanding flange 22. A rigid upstanding bearing bracket 23 is bolted or otherwise rigidly connected to the flange 22, and the bracket includes laterally spaced vertical legs 24 and 25, which have their upper ends alignedly perforated horizontally to journal a horizontal shaft 26. Between the two bearing legs 24 and 25, there is rigidly anchored to the shaft 26 the right hand end of a rocker-arm 27 which is preferably formed out of channel iron, as shown. The side flanges of the channel iron rocker-arm 27 are alignedly perforated horizontally, adjacent the free left hand end of the arm, and the two perforations journal for rotation a horizontal shaft 28. A portion of the web of the rocker-arm 27 is cut away, as indicated best in Fig. 2 by the reference numeral 29. This leaves a space between the side flanges of the rocker-arm at the left hand end portion thereof, and the shaft 28 spans this space. The gauge wheel 21 is rigidly keyed or otherwise anchored to the shaft 28, and is adapted to rotate with the shaft within said space (Fig. 6). The two side flanges of the rocker-arm 27 are indicated by the reference numerals 30 and 31, and surrounding their respective shaft journalling perforations, the flanges are provided with integral laterally extending sleeve bearings 32 and 33. The gauge wheel 21 has a tubate hub 34 which surrounds the shaft 28.

Figure 3:
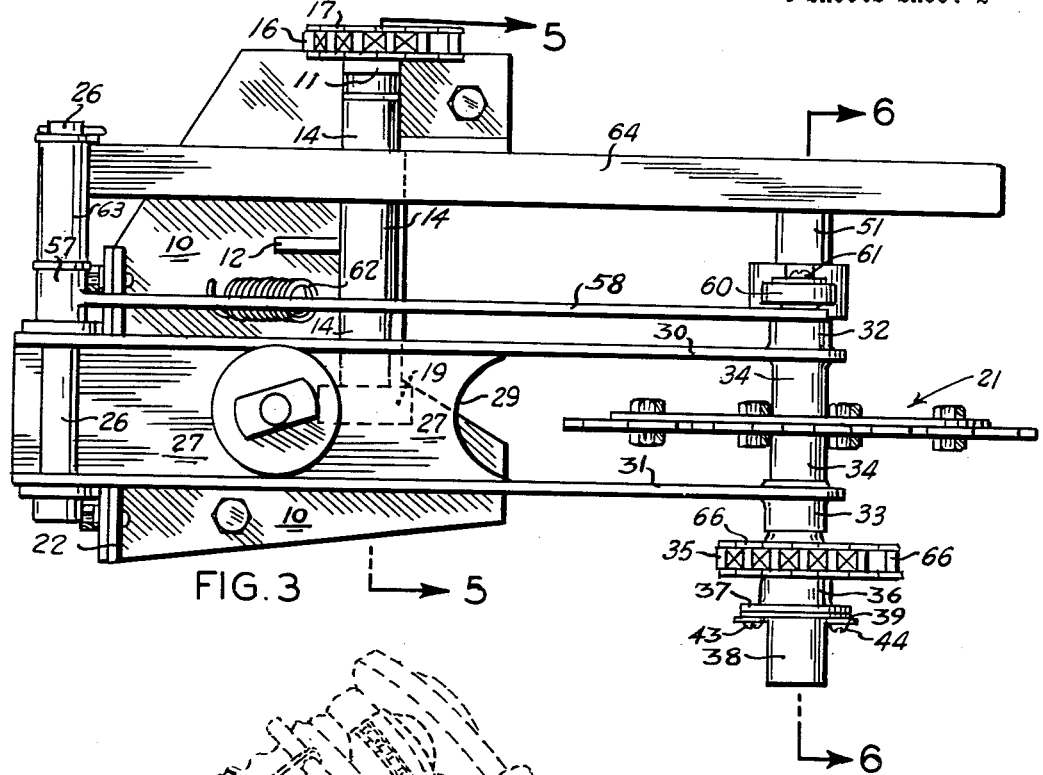
Figure 3 is a top view of the mechanism of the invention, per se.

The assembly associated with the shaft 28 is shown in section in Fig. 6, is best shown in plan view in Fig. 3, and its individual parts are illustrated in Figs. 7 and 8. The shaft 28 projects laterally beyond the sleeve bearings 32 and 33 in both directions, and as viewed in Figs. 2 and 6, the right hand projecting end of the shaft 28 is provided with a sprocket 35 which is rotatable thereon, and the hub 36 of which has an annular flange 37. A sleeve 38 having an annular flange 39 is provided on the extreme right hand end of the shaft 28, and is anchored to the shaft by a set-screw or other equivalent 40 (Figs. 6 and 7).

The flange 39 is provided with two diametrically opposed arcuate slots 41 and 42 which are concentric with the bore of the sleeve, and two studs 43 and 44 are respectively passed through washers 45 and 46, and then through the slots 41 and 42. The studs are threadedly engaged within threaded perforations 47 and 48 in the flange 37 of the sprocket 35 to draw the flanges 37 and 39 into face to face relation, but are left sufficiently loose to allow independent relative rotation of the sleeve and sprocket within the limits of the simultaneous travel of the studs 43 and 44 within the slots 41 and 42. The purpose of this limited rotary slip movement of the sleeve 38 with relation to the sprocket 35 is more fully described hereinbelow.

That portion of the shaft 28 which projects in a left hand direction laterally beyond the sleeve bearing 32 of the side flange 30 of the rocker-arm 27, is enveloped by a tubate head 49 which is anchored to the shaft by one or more set-screws 50. The head 49 consists substantially of a hollow sleeve portion 51, having an integral cylindrical enlargement 52 on its inner end, and the annular face of the enlargement is provided with a transverse groove 53 which extends entirely thereacross. The outermost end of the sleeve portion 51 has a laterally extending rigid cross-arm 54 integral therewith, and the two ends of the cross-arm are provided with rollers 55 mounted on pivot pins 56 screwed into the outer face of the arm ends. The purposes of the groove 53 and the arm-carried rollers 55 are more fully described hereinbelow.

Returning now more particularly to Figs. 2, 3, 4 and 9 of the drawings, and particularly to the shaft 26 and its associated elements, it may be seen that the shaft projects laterally some distance to the left hand beyond the side flange 30 of the rocker-arm 27. This laterally projecting portion of the shaft is provided, next to the flange 30, with a tubate hub 57 which is rotatable or rockable with relation to the shaft. Integral with the hub 57 is the outer end of an arm 58 having its edges presented vertically. The arm 58 is of sufficient length to extend inwardly to a point above the enlargement 52 of the head 49 on the shaft 28, and the inner end of the arm 58 is equipped with a roller 60 mounted upon a suitable pivot pin 61. The roller 60 is properly located to fit within the groove 53 in the face of the enlargement 52, and a helical retrieving spring 62 is provided between the arm 58 and the plate 10, to hold the roller 60 in constant contact with the face of said enlargement. When the roller 60 is engaged within the groove 53, the cross-arm 54 is held resiliently in a horizontal position. The purpose of such a cross-arm setting is more fully described hereinbelow.

With further reference to the shaft or pivot pin 26, Figs. 3 and 9 best illustrate that the left hand projecting end portion of the shaft is further equipped with a tubate hub 63, which is keyed or otherwise rigidly connected to the shaft. The specific means for anchoring the hub 63 to the shaft 26 is not shown in the drawings, but may be conventional in nature. The hub 63 is made integral with the front end of an elongated flat bar 64, the other or free end of which extends rearwardly beyond the head 49. The bar 64 is so located laterally that its free end portion is located above the cross-arm 54 and directly within the rotative path of the cross-arm rollers 56. A retrieving spring 65 is connected to the bar 64 and the plate 10 to resiliently urge the free end of the bar in a downward direction. Obviously, when the free end of the bar 64 is in its lowermost or substantially horizontal position, the bar forces the cross-arm 54 into a similarly horizontal position. The bar 64 therefore, by its contact with the cross-arm 54, acts to return the gauge wheel 21 to its original radial position, each time the cam-roller 19 raises the wheel out of contact with hay in the bale case 2, and thus renders the wheel free to be rotated by the bar. When the cross-arm 54 is thus urged to its normal horizontal position, the groove 53 in the enlargement 52 of the head member 49 is brought uppermost, and is therefore in the proper position to be engaged by the roller 60 on the rear end of the bar 58. Since the spring 62 pulls downwardly on the bar 58, the roller 60 is resiliently pressed into the groove 53, and the wheel 21 is thereby held in its normal radial position.

The teeth of the sprocket 35 on the shaft 28 are in face to face alignment with the teeth of a similar sprocket, not shown, but which is rigidly mounted on the shaft 3 and forms a part of the bale tying mechanism. This other sprocket on the shaft 3 is one which, when rotated a given amount, places the bale tying mechanism into operation, and this other sprocket and the sprocket 35, are both drivably engaged with each other by an endless chain 66. Consequently, when the wheel 21 has been rotated by movement of the hay through one complete revolution, the sprocket 35 and the chain 66 act to rotate the shaft 3 and to thereby trip or start the bale tying mechanism of the baler. As stated hereinabove, operation of the bale tying mechanism through one tying cycle, causes rotation of the shaft 4 through one complete revolution, and consequently, the shaft 4, the sprocket 5, the chain 17 and the sprocket 16 function to rotate the cam-shaft 15 through one complete revolution, thereby causing the cam-roller 19 to raise the wheel 21 out of its hay engaging position each time the bale tying mechanism functions to tie a bale.

As a means for selectively adjusting the enlargement 52 and its superficial groove 53 radially with relation to the measuring wheel 21, the sleeve 38 has been provided. By radially shifting the flange 39 with relation to the flange 37 of the hub 36, and by then setting the two by tightening the two studs 43 and 44, the sprocket 35 is radially adjusted with relation to the shaft 23, and consequently with relation to the wheel 21 which is anchored to the shaft. The result of this radial adjustment is to shift the hub 52 with relation to the sprocket 35. Therefore, when the chain 17 rotates the sprocket 35, the wheel 21 is in a slightly different radial position, when the groove 53 is uppermost, or in other words, when the roller 60 is in engagement with the groove 53. This slight shifting of the wheel 21 radially leaves the wheel a lesser or greater distance to rotate each time, before the bale tying mechanism is actuated. The result is an adjustment in the length of the bale being tied.

As a means for urging the arm 27 downwardly so that the wheel 21 normally remains in contact with hay in the bale box 2, the plate 10 is provided with an upstanding pin 70 which passes through a perforation or slot, not shown, in the arm 27. Above the arm, the pin 70 is provided with a helical compression spring 71, a washer 72, and thereabove a nut 73.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In a hay baler wherein a bale gauging wheel in contact with hay being pressed within a bale-case is used to trip-actuate a bale tying mechanism powered by a driven shaft, the combination with said bale-case, said gauge wheel, said tying mechanism and said driven shaft, of: a rocker-arm rotatably supporting said wheel for movement into and out of contact with said hay; means for so moving the wheel each time the tying mechanism functions, said means including a cam for actuating the rocker-arm and a driving connection between said cam and said driven shaft; and means for re-setting the wheel in a selected radial position each time it is moved out of contact with the hay, said re-setting means including a shaft rotatable by said wheel, a cross-arm rigidly connected to said wheel shaft, and means for forcing the cross-arm to a selected position each time the wheel is moved out of contact with the hay.

2. In a hay baler wherein a bale gauging wheel in contact with hay being pressed within a bale-case is used to trip-actuate a bale tying mechanism powered by a driven shaft, the combination with said bale-case, said gauge wheel, said tying mechanism and said driven shaft, of: a pivot pin horizontally mounted on the top of said bale-case; a rocker-arm having one end mounted on said pin; a shaft horizontally journaled for rotation on the free end of said rocker-arm and supporting said wheel; means for moving the wheel into and out of contact with the hay each time the tying mechanism functions, said means including a cam for actuating the rocker-arm and a driving connection between said cam and said driven shaft; and means for re-setting the wheel in a selected radial position each time it is moved out of contact with the hay, said re-setting means including a cross-arm rigidly connected to the wheel supporting shaft, a roller carried by each end of the cross-arm, an elongated bar having one end fixed on said pivot pin, and having its free end portion located in the path of the cross-arm rollers, and a retrieving spring urging the free end of the bar in a downward direction to normally maintain the cross-arm in a horizontal position.

References Cited in the file of this patent

UNITED STATES PATENTS

| 1,205,980 | Dudley | Nov. 28, 1916 |
| 1,257,466 | Dudley | Feb. 26, 1918 |
| 1,305,344 | Dudley | June 3, 1919 |
| 2,405,688 | Crumb | Aug. 13, 1946 |

FOREIGN PATENTS

| 274,700 | Germany | May 28, 1914 |